(12) United States Patent
Xiang et al.

(10) Patent No.: US 11,549,661 B2
(45) Date of Patent: Jan. 10, 2023

(54) ILLUMINATION DEVICE AND TESTING DEVICE

(71) Applicant: TRIPLE WIN TECHNOLOGY(SHENZHEN) CO.LTD., Shenzhen (CN)

(72) Inventors: Cheng Xiang, Shenzhen (CN); Yen-Sheng Lin, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/536,278

(22) Filed: Nov. 29, 2021

(65) Prior Publication Data
US 2022/0243892 A1    Aug. 4, 2022

(30) Foreign Application Priority Data

Feb. 2, 2021 (CN) .......................... 202120300179.8

(51) Int. Cl.
| F21V 5/00 | (2018.01) |
| F21V 23/00 | (2015.01) |
| H05B 45/28 | (2020.01) |
| F21Y 115/10 | (2016.01) |

(52) U.S. Cl.
CPC ............ *F21V 5/008* (2013.01); *F21V 23/003* (2013.01); *H05B 45/28* (2020.01); *F21Y 2115/10* (2016.08)

(58) Field of Classification Search
CPC ........ F21V 5/008; F21V 23/003; H05B 45/28

USPC .......................................................... 362/257
See application file for complete search history.

(56) References Cited

U.S. PATENT DOCUMENTS

| 7,566,154 B2* | 7/2009 | Gloisten .................. B60Q 3/47 362/240 |
| 8,272,758 B2* | 9/2012 | Meir ..................... G02B 6/0041 362/613 |
| 8,604,678 B2* | 12/2013 | Dai ........................... F21V 9/30 313/112 |
| 8,610,341 B2* | 12/2013 | Dai ......................... F21K 9/232 313/112 |
| 8,614,539 B2* | 12/2013 | Dai ........................... F21K 9/64 313/112 |
| 9,512,984 B2* | 12/2016 | Tessnow ................. F21V 13/04 |
| 9,557,034 B2* | 1/2017 | Woodgate ................ F21K 9/90 |
| 10,760,745 B2* | 9/2020 | Einig ..................... F21S 43/14 |
| 2003/0038596 A1* | 2/2003 | Ho ........................ H01L 33/501 257/E33.074 |
| 2003/0156425 A1* | 8/2003 | Turnbull ................. F21S 43/14 362/800 |
| 2004/0239243 A1* | 12/2004 | Roberts ............... H01L 25/0753 257/E25.02 |
| 2007/0240346 A1* | 10/2007 | Li .......................... G09F 13/22 40/544 |

(Continued)

*Primary Examiner* — Bryon T Gyllstrom
(74) *Attorney, Agent, or Firm* — ScienBiziP, P.C.

(57) ABSTRACT

An illumination device includes a box body, a LED module, and a light homogenizing plate. A variety of different color temperatures are set in different chips controlling the LEDs in the LED module. The homogenizing plate converts light, such that the illumination device can generate light beams of various color temperatures. The test requirements applicable to different lenses or in relation to different color temperatures of the same lens at different periods can thus be met.

12 Claims, 4 Drawing Sheets

(56) References Cited

U.S. PATENT DOCUMENTS

2012/0188755 A1\* 7/2012 Maglica ............... G06F 13/16
362/217.02

\* cited by examiner

ILLUMINATION DEVICE AND TESTING DEVICE

FIELD

The subject matter herein generally relates to an illumination device and a testing device.

BACKGROUND

Optical lenses are widely used in mobile phones, tablet computers, cars, and camera modules of other terminal devices. After the optical lenses are manufactured, the optical lenses must be tested in order to ensure a photographic quality of the optical lenses.

Existing optical test equipment can only emit light beams with a single color temperature, and thus cannot be used to test different optical lenses or different color temperatures of the same optical lens.

BRIEF DESCRIPTION OF THE DRAWINGS

Implementations of the present technology will now be described, by way of example only, with reference to the attached figures.

DETAILED DESCRIPTION

Figure 1:
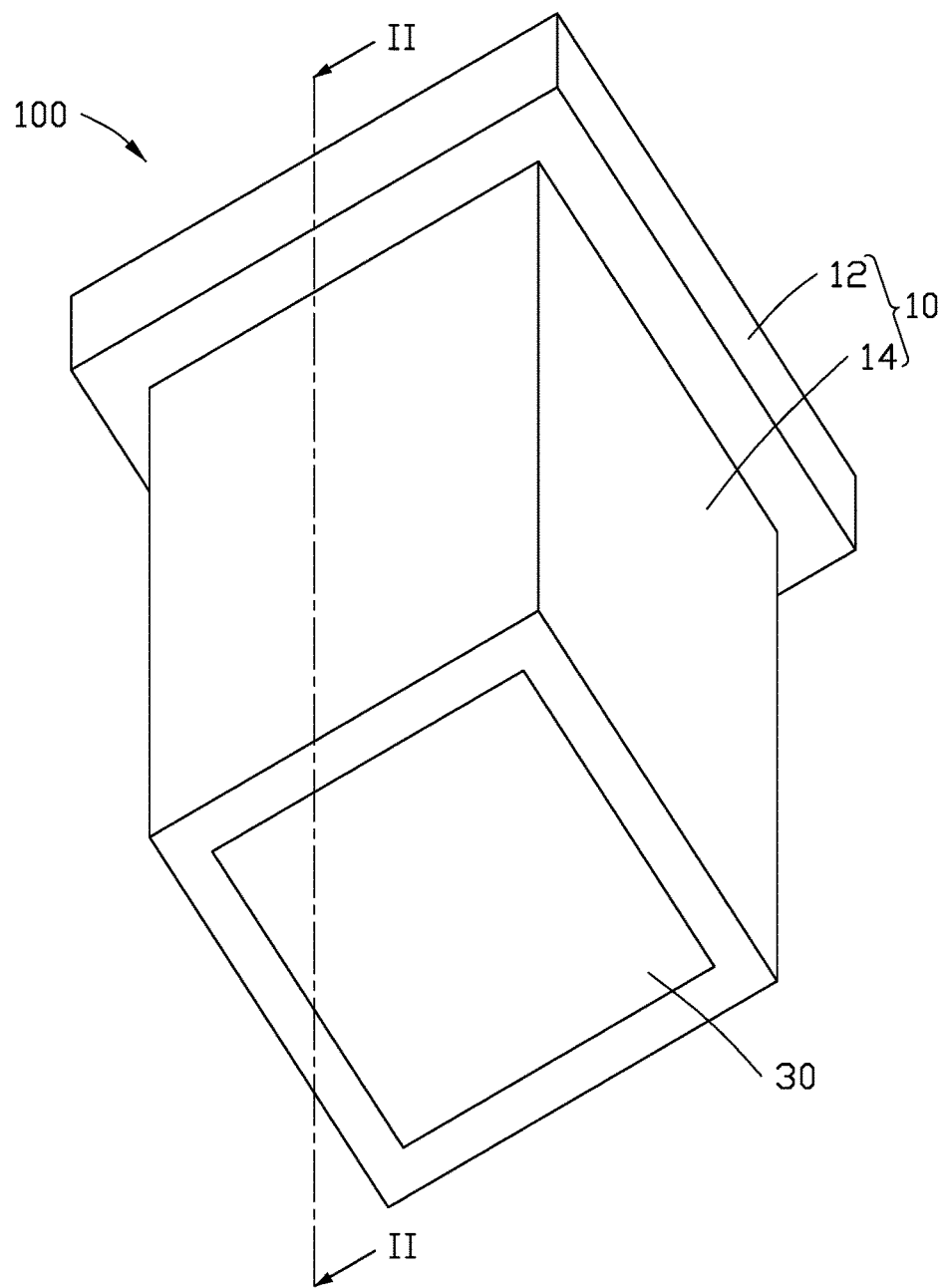
FIG. 1 is a diagrammatic view of an embodiment of an illumination device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an illumination device 100 is provided. The illumination device 100 is used to provide light sources of different color temperatures during an optical test of a lens 220 (referring to FIG. 4). The lens 220 can be applied in a mobile phone, a camera, a car, or the like.

Figure 2:
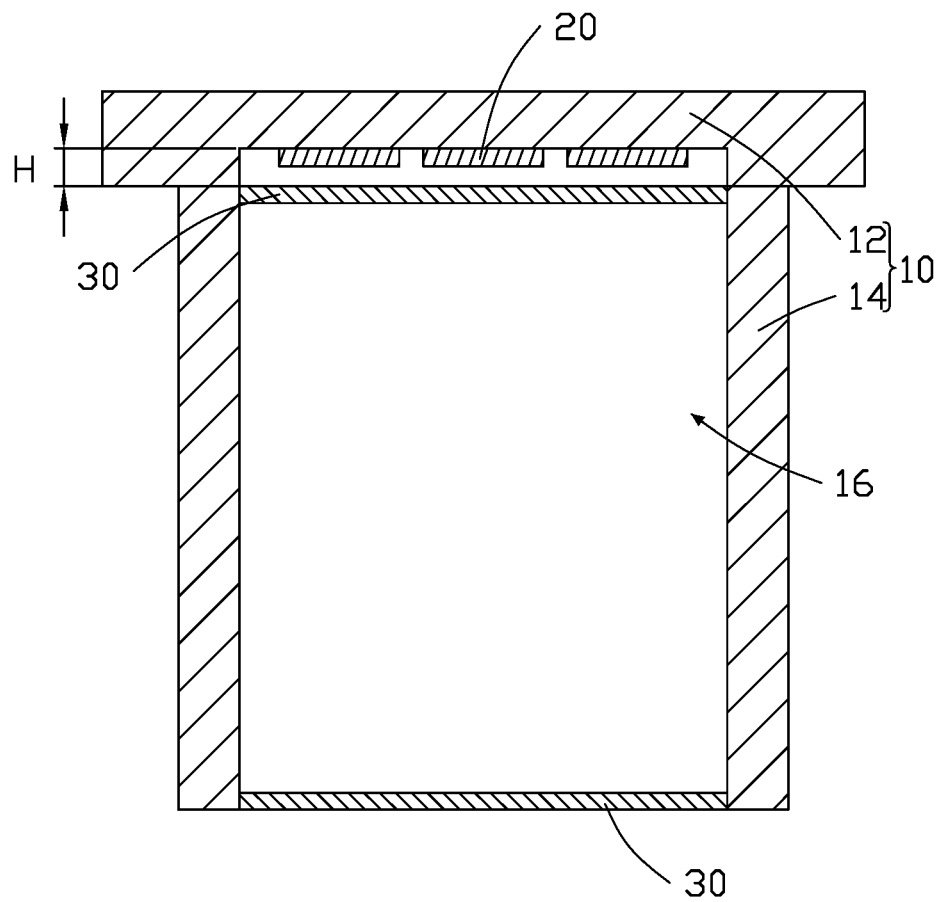
FIG. 2 is a cross-sectional view along line II-II in FIG. 1.

Referring to FIG. 2, the illumination device 100 includes a box body 10, an LED (light emitting diode) module 20, and at least one light homogenizing plate 30. The LED module 20 is disposed in the box body 10. The LED module 20 can emit light beams. The light homogenizing plate 30 is fixed on the box body 10 and disposed on the light path of the light beams.

The box body 10 includes a bottom plate 12 and a side plate 14. The side plate 14 surrounds the bottom plate 12 to form a space 16.

The box body 10 is made of opaque material, which prevents the light beams emitted by the LED from passing out of the box body 10, thereby reducing a difference between the light beams emitted by the LED module 20 and the light beams transmitted to the lens 220. In some embodiments, the box body 10 is made of an alloy or a polymer. The box body 10 also has anti-reflective properties, which prevents external light from entering the box body 10 and then interfering with the light beams emitted by the LED.

The LED module 20 is disposed on the bottom plate 12, and the light beams emitted by the LED module 20 pass through the space 16.

Figure 3:
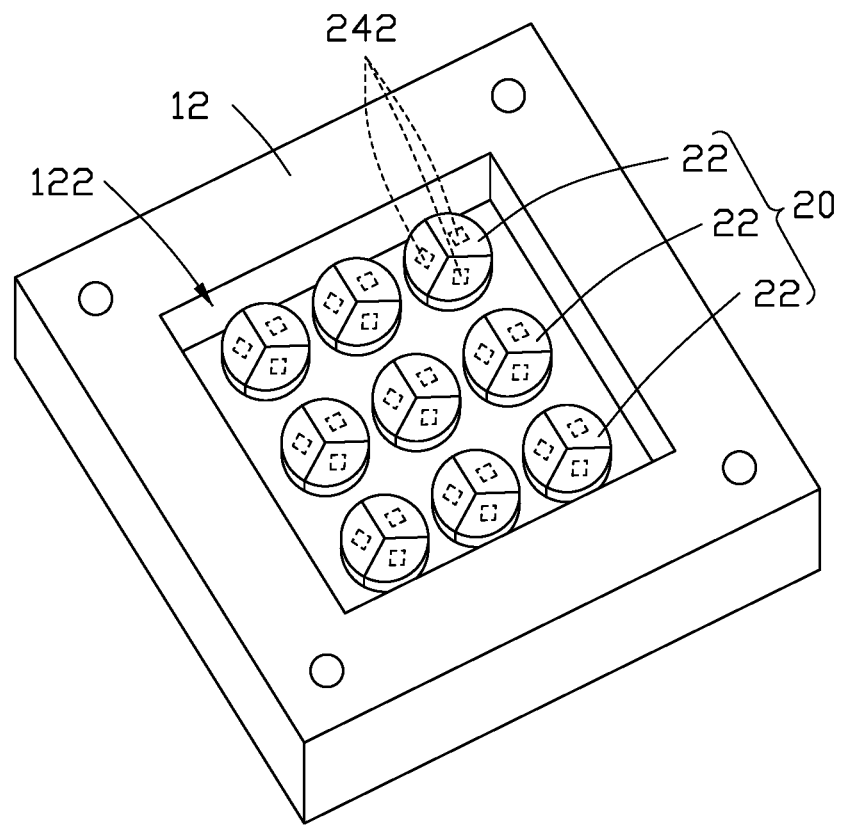
FIG. 3 is a diagrammatic view of a chip accommodated in a groove of a bottom board of the illumination device of FIG. 1.

Referring to FIG. 3, in some embodiments, the bottom plate 12 includes a groove 122. The groove 122 is on a surface of the bottom plate 12 connecting the side plate 14 in a direction away from the side plate 14. The LED module 20 is disposed in the groove 122. Sidewalls defining the groove 122 prevent light leakage.

In some embodiments, a depth H of the groove 122 is from 2 cm to 3 cm.

Referring to FIG. 3, the LED module 20 includes a plurality of LEDs (light emitting diodes) 22, which are connected in parallel, so that each of the LEDs 22 can be independently controlled. In some embodiments, the LEDs 22 are arranged in an array.

Each of the plurality of LEDs 22 includes a plurality of chips 242. Each of the chips 242 is set with a color temperature. Thus, different chips 242 are set with different color temperatures. Therefore, different chips 242 and different LEDs 22 can control a color temperature and luminous intensity of the illumination device 100 to simulate different types of light sources.

In some embodiments, each of the plurality of LEDs 22 includes three chips 242, and the color temperatures of the three chips 242 are 2000 K, 3000 K, and 5000 K, respectively. When the illumination device 100 is required to emit light beams with a color temperature of 3000K, the chip 242 of each LED 22 having a color temperature of 3000K can be turned on. It is also possible to control a voltage value of the chip 242 with different color temperatures to control the color temperatures of the LED module 20. In addition, the luminous intensity of the LED module 20 can also be controlled by the number of LEDs 22 which are turned on. That is, the color temperature and the luminous intensity of the illumination device 100 can be flexibly controlled by the state of the chip 242.

When there are multiple light homogenizing plates 30, the light homogenizing plates 30 are arranged in parallel, and at least one light homogenizing plate 30 seals the box body 10. The light homogenizing plate 30 disperses the point light emitted by the LEDs 22 into surface light, so that the illumination device 100 can be used for testing the optical lenses.

In an embodiment, there are two light homogenizing plates 30, and the light homogenizing plates 30 and the LED module 20 are spaced apart from each other.

When some of the LEDs 22 malfunction or are damaged, the light homogenizing plate 30 can be flexibly controlled to achieve a desired test effect with the cooperation of other LEDs 22.

Figure 4:
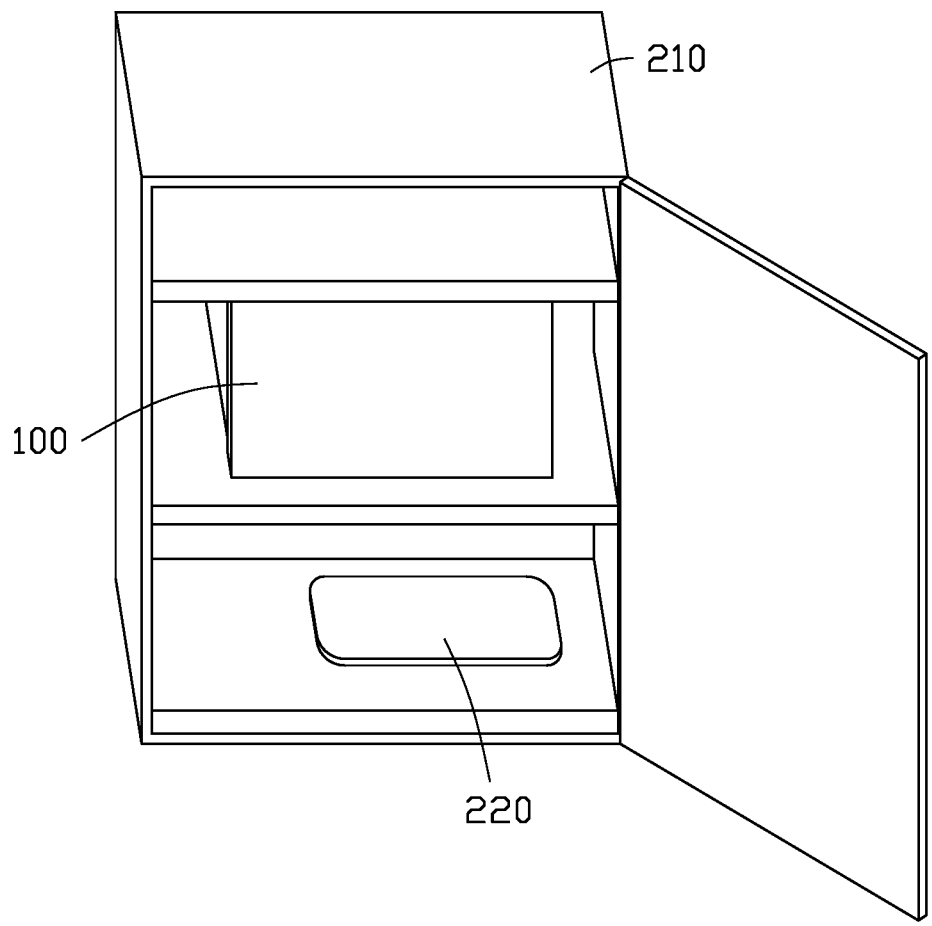
FIG. 4 is a diagrammatic view of an embodiment of a testing device according to the present disclosure.

Referring to FIG. 4, a testing device 200 is further provided. The testing device 200 includes a main body 210 and the illumination device 100. The illumination device 100 is electrically connected to the main body 210. The main body 210 can control the light-emitting state of the illumination device 100, such as the color temperature and the voltage value of the LEDs 22, so that the illumination device 100 becomes a suitable surface light source.

The illumination device 100 of the present disclosure includes the LED module 20 and the light homogenizing plate 30. A variety of different color temperatures are set in the chip of the LED 22 in the LED module 20. When the light beams from the LED module 20 are diffused by the homogenizing plate 30, the illumination device 100 generates light beams of various color temperatures, so as to meet the test requirements for different lenses or different color temperatures of the same lens.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An illumination device comprising:
   a box body made of opaque material, the box body comprising a bottom plate and a side plate, the side plate connecting to a bottom surface of the bottom plate, and the side plate and the bottom plate cooperatively defining a space, a groove defined on the bottom surface and communicating with the space;
   a light emitting diode (LED) module disposed in the groove, the LED module comprising a plurality of LED; and
   a light homogenizing plate fixed on the box body and disposed on a light path of the LED module;
   wherein, each of the plurality of LEDs comprises a plurality of chips of different color temperatures, the plurality of LEDs is connected in parallel.

2. The illumination device of claim 1, wherein a depth of the groove is from 2 cm to 3 cm.

3. The illumination device of claim 1, wherein the homogenizing plate is disposed on an end of the side plate away from the bottom plate.

4. The illumination device of claim 1, wherein the homogenizing plate and the LED module are spaced apart from each other.

5. The illumination device of claim 1, wherein each of the plurality of LEDs comprises three chips, and the color temperatures of the three chips are 2000 K, 3000 K, and 5000 K, respectively.

6. The equipment of claim 1, wherein the box body is made of an alloy or a polymer.

7. A testing device, comprising:
   an illumination device comprising:
   a box body made of opaque material, the box body comprising a bottom plate and a side plate, the side plate connecting to a bottom surface of the bottom plate, and the side plate and the bottom plate cooperatively defining a space, a groove defined on the bottom surface and communicating with the space;
   a light emitting diode (LED) module disposed in the groove, the LED module comprising a plurality of LED; and
   a light homogenizing plate fixed on the box body and disposed on a light path of the LED module;
   wherein, each of the plurality of LEDs comprises a plurality of chips of different color temperatures, the plurality of LEDs is connected in parallel.

8. The testing device of claim 7, wherein a depth of the groove is from 2 cm to 3 cm.

9. The testing device of claim 7, wherein the homogenizing plate is disposed on an end of the side plate away from the bottom plate.

10. The testing device of claim 7, wherein the homogenizing plate and the LED module are spaced apart from each other.

11. The testing device of claim 7, wherein each of the plurality of LEDs comprises three chips, and the color temperatures of the three chips are 2000 K, 3000 K, and 5000 K, respectively.

12. The testing device of claim 7, wherein the box body is made of an alloy or a polymer.

* * * * *